United States Patent [19]

Bowen

[11] Patent Number: 4,843,682
[45] Date of Patent: Jul. 4, 1989

[54] POULTRY DEBONER

[76] Inventor: David G. Bowen, 12 Trigg Street, Carlingford, New South Wales, 2118, Australia

[21] Appl. No.: 128,863

[22] Filed: Dec. 4, 1987

[30] Foreign Application Priority Data

Dec. 5, 1986 [AU] Australia ............... PH9352

[51] Int. Cl.⁴ ............................................. A22C 17/04
[52] U.S. Cl. ........................................ 17/11; 17/1 G; 17/46
[58] Field of Search ............................. 17/1 G, 11, 46

[56] References Cited

U.S. PATENT DOCUMENTS

| | | | |
|---|---|---|---|
| 2,817,862 | 12/1957 | Frazho et al. | 17/1 G X |
| 3,965,535 | 6/1976 | Kaplan et al. | 17/1 G |
| 3,992,734 | 11/1976 | Chiron et al. | 17/1 G |
| 4,151,847 | 5/1979 | Van Donkelaar | 17/1 G X |
| 4,216,565 | 8/1980 | Volk et al. | 17/1 G |
| 4,639,974 | 2/1987 | Olson | 17/1 G X |

Primary Examiner—Willie G. Abercrombie
Attorney, Agent, or Firm—Birch, Stewart Kolasch & Birch

[57] ABSTRACT

Poultry thigh and drumstick deboning device, comprising clamping means for holding a said poultry thigh or drumstick firmly down onto a deboning plate; a pair of spring-biased gripper jaws adapted to grip a protruding end of the bone of the poultry thigh or drumstick on said deboning plate; and a rotary cutter blade assembly adapted to separate the meat from the bone as the thigh or drumstick is drawn through the said assembly by said gripper jaws, said jaws being rotatably driven during passage of the bone through the assembly; the cutter blades of the said cutter blade assembly being made from a material which is hard enough to cut off the meat but which is not hard enough to cut into the bone.

6 Claims, 3 Drawing Sheets

POULTRY DEBONER

This invention relates to poultry processing plant and more particularly to apparatus for the deboning of poultry thighs or drumsticks.

Manual deboning of poultry drumsticks or thighs is both labour intensive and expensive. Moreover, it is also uneconomical as it is difficult to remove all of the meat from the bone; meat left on the bone is wasted.

There are, extant, apparatus for the deboning of thighs or drumsticks, but the currently available devices all have disadvantages. For example, they give a poor yield, that is to say, they frequently cut into or break the bones, resulting in bone fragments being left in the deboned meat. This can be dangerous if the meat gets as far as the consumer and thus the product from these devices must be carefully checked.

It is therefore an object of the present invention to overcome the above and other disadvantages of the prior art devices by the provision of a poultry thigh and drumstick deboning device capable of removing a very high proportion of the meat from the bone while not cutting into the bone itself.

To this end, and in accordance with the present invention, there may be provided a poultry thigh and drumstick deboning device, comprising clamping means for holding said poultry thigh or drumstick firmly down onto a deboning plate; a pair of spring-biased gripper jaws adapted to grip a protruding end of the bone of the poultry thigh or drumstick on said deboning plate; and a rotary cutter blade assembly adapted to separate the meat from the bone as the thigh or drumstick is drawn through the said assembly by said gripper jaws, said jaws being rotatably driven during passage of the bone through the assembly; the cutter blades of the said cutter blade assembly being made from a material which is hard enough to cut off the meat but which is not hard enough to cut into the bone.

Preferably, the gripper jaws are able to grip the bone end firmly enough to cause the thigh or drumstick to rotate therewith but loosely enough to avoid fracturing the bone.

The cutter blades may well be three flexible plastic discs all rotatable in the same direction; the cutter blades being disposed angularly, with respect to the longitudinal axis of the bone, in two directions—against the bone as it is drawn through the device, and against the direction of rotation of the bone.

Ideally, the deboning plate is one plate of an indexing feed-in plate conveyor adapted to convey, intermittently, poultry thighs and drumsticks from a supply station to a deboning station situated beneath said clamping means.

The clamping means may incorporate a bone pusher adapted to contact, and to urge forward, the bone of a poultry thigh so as to cause it to protrude from the meat towards the cutter blade assembly, for gripping by said gripper jaws; the deboning station being provided with a notched-edge member adapted to prevent the poultry thigh bone from elastically withdrawing into the meat subsequent to clamping down.

In order that the reader may gain a better understanding of the present invention, hereinafter will be described a preferred embodiment thereof, by way of example only and with reference to the accompanying drawings in which.

Figure 1:
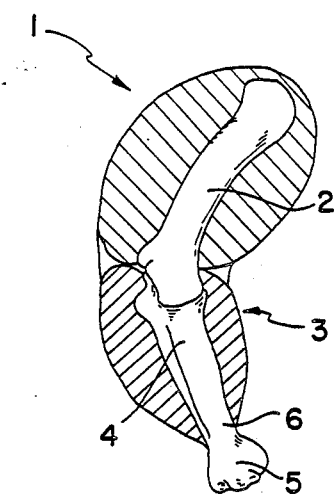
FIG. 1 is a diagrammatic illustration of a thigh and drumstick.

FIG. 1 is a diagrammatic illustration of those portions of poultry limbs known to the trade as "thighs" and "drumsticks". The thigh, generally referenced 1, is a flattish portion of meat having embedded in it the femur or thigh-bone 2 while the portion below it, the drumstick, generally referenced 3 is approximately circular in transverse cross-section and contains the legbone 4, that is to say, the semi fused tibia and fibula. Below the ankle joint 5 the 'legs' are scaly and constituted by the tarsus, which is an elongate mass of fused metatarsal or foot bones.

The drumstick meat will not separate easily from the underlying bone until the ankle-joint sinews, in the region indicated at 6, are severed.

Figure 2:
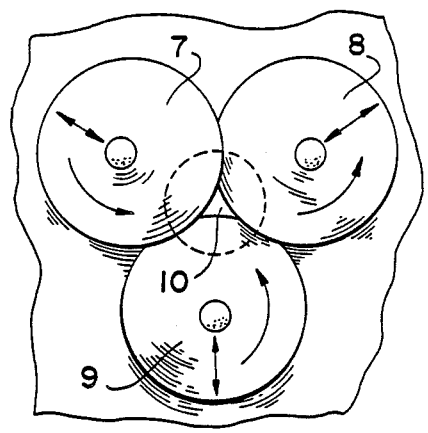
FIG. 2 is a front view of the cutter blade assembly.
Figure 3:
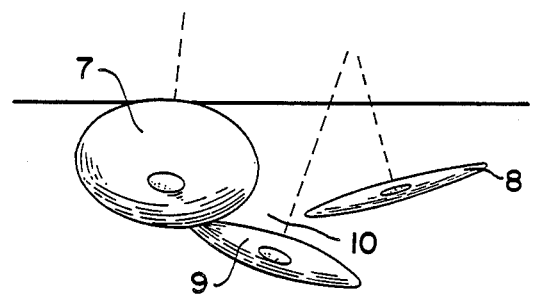
FIG. 3 is a corresponding top plan view.

In FIGS. 2 and 3, there is to be seen a rotary cutter blade assembly having three discoid blades 7, 8 and 9. These cutter blades are preferably made from a flexible plastic material, or some such similar substance which is hard enough to cut off the meat but which is not hard enough to cut into the bone. The cutter blades are angularly disposed, with respect to the longitudinal axis of the bone, in two directions. The first angle is against the bone as it is drawn through the device, and the second angle is against the direction of rotation of the bone in relation to the cutter assembly; this arrangement ensures a quick and clean paring action.

All three of cutter blades 7, 8 and 9 rotate in the same direction. It is envisaged that the whole cutter blade assembly might well be arranged to rotate also in that same direction. Cutter blades 7, 8 and 9 are mounted within the assembly so as to permit of inward movement to make initial contact with the thigh or drumstick, as it moves towards and through the "iris" 10, and to commence their cutting action. Thereafter, the pressure exerted upon the bone by each blade is adjustable. Axial movement of the cutter blade shafts is occasioned by appropriate pneumatic piston/cylinder assemblies.

Figure 4:
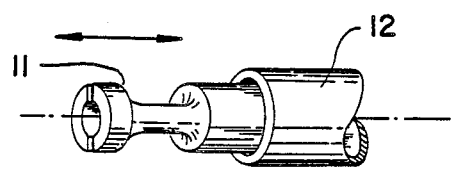
FIG. 4 shows a pair of spring-biased gripper jaws

Axially spaced from the cutter blade assembly is a pair of spring-biased gripper, jaws 11 which are extendable from, and withdrawable into, by means of a pneumatic piston-and-cylinder assembly, a collet 12—see FIG. 4. It is important that the dimensions and geometry of the jaws are such that they are able to grip the bone and firmly enough to enable the thigh or drumstick to rotate therewith but loosely enough to avoid fracturing the bone. The gripper jaws 11 themselves may rotate in a direction counter to that of the cutter blade assembly. Within the gripper may be provided a stop (not shown) to prevent the bone being pushed too far into the jaws of the gripper.

Figure 5:
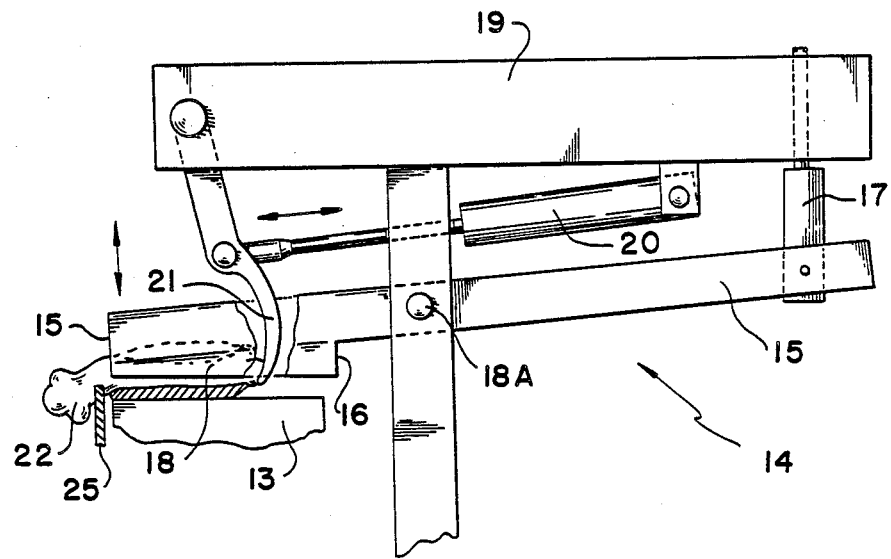
FIG. 5 is a schematic side elevation of clamping means and bone pusher.
Figure 6:
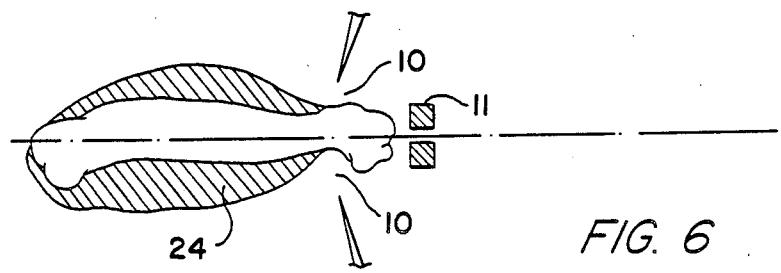
FIGS. 6 to 9 illustrate the progress of a "composite" poultry portion through the device Throughout the drawings, which will be understood to be both simplified and schematic, like integers are referenced by the same numeral.
Figure 7:
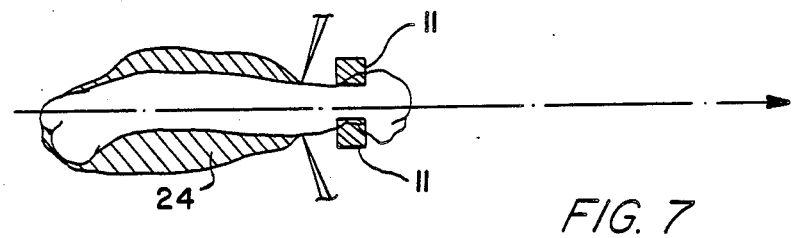
Figure 8:
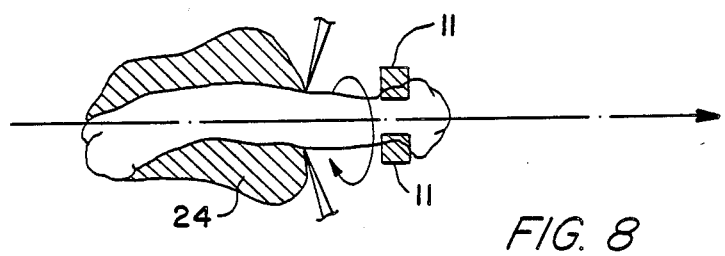
Figure 9:
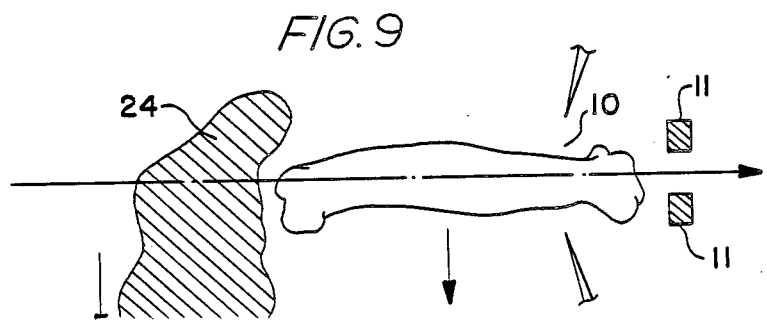

FIG. 5 is a schematic side elevation of a clamping means and bone pusher.

Poultry thighs and drumsticks are conveyed from a supply station, each poultry limb being preferably manually placed onto a plate of an indexing, feed-in plate conveyor which is adapted to convey the thighs or drumsticks intermittently or in discrete movements, to a deboning station 13, which is situated beneath a clamping means generally referenced 14. The clamping means includes a frame 15 and a clamping platen 16 adapted to firmly hold a poultry thigh or drumstick down onto a deboning plate. The deboning plate is not a specific integer, but just one plate of the indexing plate conveyor.

The clamping means is actuated by a hydraulic piston-and-cylinder assembly 17, and is pivoted at 18A, so as to cause platen 16 to press down on a poultry thigh or drumstick 18 as the latter halts beneath it. At this point, the gripper jaws 11 grasp the end of the bone and begin to draw it through the "iris" of the cutter blade assembly.

However, when the poultry portion is a thigh, with an embedded femus, the bone end must be caused to protrude so as to be able to be gripped by jaws 11. To achieve this, the upper beam 19 of the clamping means 14 has pivoted to it one end of a hydraulic piston-and-cylinder assembly 20, the other end of which is pivoted to a bone pusher 21.

Bone pusher 21 protrudes bone end 22 and, to prevent the thigh bone from elastically withdrawing into the meat—as it will tend to do naturally—there is provided a notched-edge member 23.

When the poultry portion is a drumstick however, preferably means should be provided to sever the ankle-joint sinews—see FIG. 1, reference numeral 6—before the portion arrives at the supply station of the plate conveyor. Furthermore, to facilitate efficient withdrawal of the leg bone, a simple means may be provided for the making of a longitudinal cut in the meat of the drumstick.

FIGS. 6 to 9 show the progress of a "composite" or generic poultry portion through the inventive device. The mode of operation is as follows: a poultry thigh or drumstick to be deboned is fed to the device through "iris" 10 at the confluence of the three cutter blades, whence gripper jaws 11 close about the protruding end of the bone to grip it firmly yet loosely, as previously described. Gripper jaws 11 continue to draw the bone through the device, making a number of revolutions as they do so; as the rotating bone proceeds the meat 24 is severed from the bone and eventually is completely separated to fall away into a collecting bin, as is to be seen in FIG. 9. The bared bone is dislodged from jaws 11 and falls into a further collecting bin.

After this operational cycle has been completed, all the various components return automatically to their starting positions ready for the next cycle to begin.

While the foregoing description has been couched in terms of poultry thighs, drumsticks etc., it is also envisaged that the inventive deboning device may well have considerable application to the deboning of animal carcass pieces—such as poultry breasts, lamb shanks and the like—other than poultry portions.

From the abovegoing, it will be readily appreciated by those skilled in the art that numerous variations and modifications may be made to the invention without departing from the scope and spirit thereof as set out in the following claims.

The claims defining the invention are as follows:

1. A poultry thigh and drumstick deboning arrangement comprising:
   clamping means for holding a poultry thigh or drumstick firmly down on a deboning plate;
   rotatable gripper jaw means for gripping an end of a bone protruding from said poultry thigh or drumstick, said rotatable gripper jaw means including gripper jaws;
   rotary cutter blade means for separating meat from said bone of said thigh or drumstick;
   said rotatable gripper jaw means also providing means for rotatably drawing said thigh or drumstick through said rotary cutter blade means; and
   said rotary cutter blade means including a cutter blade assembly having rotary cutter blades formed of a material which is of a sufficient hardness to cut off and through poultry meat, but which is of insufficient hardness to cut into poultry bone.

2. An arrangement as claimed in claim 1, wherein said gripper jaws are so formed as to allow the end of a bone to be gripped firmly enough to cause said thigh or drumstick to rotate therewith, but loosely enough to avoid fracturing said bone.

3. An arrangement as claimed in claim 1, wherein said cutter blade assembly is rotatable.

4. An arrangement as claimed in claim 1, wherein said gripper jaws rotate in a direction opposite to the direction of rotation of said rotary cutter blades.

5. An arrangement as claimed in claim 1, wherein said cutter blades are in the form of flexible plastic discs, rotatable in the same direction, said blades being disposed angularly, relative to the longitudinal axis of the bone, in two directions, against the bone as it is drawn through said assembly and against the direction of rotation of the bone.

6. An arrangement as claimed in claim 1, wherein said clamping means include a bone pusher member adapted to contact, in use, and to urge forward, said bone of a poultry thigh or drumstick, so as to cause it to protrude from the meat, towards said cutter blade assembly, for gripping by said rotatable gripper jaws; and means being provided for preventing said bone from elastically withdrawing into said meat subsequent to being held in position by said clamping means.

* * * * *